United States Patent
Kubo et al.

(10) Patent No.: US 8,309,155 B2
(45) Date of Patent: Nov. 13, 2012

(54) VEGETABLE AND/OR FRUIT DRINK COMPOSITION

(75) Inventors: Yuko Kubo, Sumida-ku (JP); Yoko Sugiura, Sumida-ku (JP); Yasushi Shioya, Sumida-ku (JP)

(73) Assignee: Kao Corporation, Tokyo (JP)

( * ) Notice: Subject to any disclaimer, the term of this patent is extended or adjusted under 35 U.S.C. 154(b) by 701 days.

(21) Appl. No.: 10/584,204

(22) PCT Filed: Dec. 27, 2004

(86) PCT No.: PCT/JP2004/019567
§ 371 (c)(1),
(2), (4) Date: Jun. 23, 2006

(87) PCT Pub. No.: WO2005/063054
PCT Pub. Date: Jul. 14, 2005

(65) Prior Publication Data
US 2007/0154615 A1    Jul. 5, 2007

(30) Foreign Application Priority Data
Dec. 25, 2003 (JP) ................................. 2003-429541

(51) Int. Cl.
*A23L 2/00* (2006.01)
(52) U.S. Cl. ............................ 426/599; 426/51; 426/590
(58) Field of Classification Search .................. 426/599
See application file for complete search history.

(56) References Cited

U.S. PATENT DOCUMENTS

| | | | |
|---|---|---|---|
| 4,988,530 A | | 1/1991 | Hoersten et al. |
| 5,234,704 A | * | 8/1993 | Devine et al. ................. 426/565 |
| 5,324,526 A | * | 6/1994 | Iwata et al. ........................ 426/2 |
| 5,736,185 A | | 4/1998 | Kohno et al. |
| 6,004,610 A | * | 12/1999 | Wang et al. ................... 426/599 |

FOREIGN PATENT DOCUMENTS

| | | | |
|---|---|---|---|
| CN | 1048981 A | | 2/1991 |
| CN | 1433271 A | | 7/2003 |
| EP | 1 250 845 A1 | | 10/2002 |
| EP | 1 224 868 B1 | | 1/2005 |
| JP | 7-51034 | | 2/1995 |
| JP | 7-501935 | | 3/1995 |
| JP | 8-298971 | | 11/1996 |
| JP | 09-117262 | | 5/1997 |
| JP | 10-502246 | | 3/1998 |
| JP | 10-295341 | | 11/1998 |
| JP | 11-262379 | | 9/1999 |
| JP | 2001-29053 | | 2/2001 |
| JP | 2002-238520 | | 8/2002 |
| JP | 2003-116496 | | 4/2003 |
| JP | 2003-250486 | | 9/2003 |
| KR | 2003-0025765 | | 3/2003 |
| WO | WO 2004/017759 | * | 3/2004 |

OTHER PUBLICATIONS

USDA National Nutrient Database for Standard Reference, Release 22 (2009), "Tomato juice, canned, without salt added", www.ars.usda.gov.*
U.S. Appl. No. 11/917,686, filed Dec. 14, 2007, Sugiura, et al.
U.S. Appl. No. 11/993,690, filed Dec. 21, 2007, Sugiura, et al.
U.S. Appl. No. 11/993,228, filed Dec. 20, 2007, Sugiura, et al.
U.S. Appl. No. 11/908,304, filed Sep. 11, 2007, Sugiura, et al.

* cited by examiner

*Primary Examiner* — Elizabeth Gwartney
(74) *Attorney, Agent, or Firm* — Oblon, Spivak, McClelland, Maier & Neustadt, L.L.P.

(57) ABSTRACT

Provided is a drink containing vegetable juice and excellent in ease of drinking. A vegetable drink composition contains from 0.1 to 1.2 wt. % of (A) solids derived from vegetables and/or fruits, (B) an acidic polysaccharide water-soluble dietary fiber, and (C) water.

29 Claims, No Drawings

VEGETABLE AND/OR FRUIT DRINK COMPOSITION

FIELD OF THE INVENTION

The present invention relates to a vegetable and/or fruit drink composition.

BACKGROUND OF THE INVENTION

The eating habits in Japan have come to be increasingly irregular due to the recent environmental changes. In particular, a serious problem lies in the unbalance of nutrients such as excess energy intake or inadequate intake of dietary fibers and minerals owing to an increase in a meal skipping ratio, solitary meal, and excessive dependency on processed foods. Such unbalance of nutrients is one of risk factors for life-style related diseases, so it is essential that the nutrient balance be optimized for a healthy life. It has been elucidated that sufficient intake of vegetables and fruits is useful for correcting the unbalanced nutrient intake. In Japan, the target intake amount of vegetables is set at 350 g or greater (standard: 292 g, according to the national nutrition survey in 1997) in "National Health Promotion Strategy for 21 Century (Health Japan 21)". In U.S.A., it is recommended to take at least five kinds of vegetables and at least three kinds of fruits a day in order to prevent life-style related diseases (5+3 campaign). With such a background existing, a method aimed at processing vegetables or fruits into a form suitable for smooth drinking is significantly needed from the standpoint of promoting a healthy life-style on a nationwide scale.

Processing of vegetables or fruits into juice is an effective means for facilitating the intake of them. Those unwilling to eat vegetables and fruits, however, are still loath to take these nutrients even when served in a form of juice, because of their unfavorable tendency toward the grassy odor or taste and a viscous texture of the juice. As one of the solutions for such a problem, there is a known vegetable juice and/or fruit juice having a less grassy odor and less bitter taste, which was developed as a consequence of focusing on the hydrophilicity-hydrophobicity balance of diacyl glyceride for a grassy odor component or bitterness component of the vegetable juice or fruit juice (Patent Document 1).

There are also other reports including a method of improving the taste of a vegetable juice or fruit juice, for example, a method using erythritol (Patent Document 2) which is one of sugar alcohols and a method using α-linked galacto-oligosaccharide (Patent Document 3) which is one of oligosaccharides, but such methods have a problem that a sweet taste of such components inevitably has an influence on the taste of the end product of the juice.

A method of improving the taste of a vegetable juice or fruit juice by adding thereto a carboxyl-containing water-soluble acidic polysaccharide is known (Patent Document 4), but it has a problem that a marked increase in the viscosity of the solution disturbs smooth drinking. In addition, such a vegetable and/or fruit composition emits a heated odor when subjected to heat sterilization treatment.

Patent Document 1: JP-A-7-51034
Patent Document 2: JP-A-9-117262
Patent Document 3: JP-A-2003-250486
Patent Document 4: JP-A-2003-116496.

DISCLOSURE OF THE INVENTION

In the present invention, there is thus provided a vegetable and/or fruit drink composition, containing the following components (A), (B) and (C):

from 0.1 to 1.2 wt. % of (A) solids derived from vegetables and/or fruits,
(B) an acidic polysaccharide water-soluble dietary fiber, and
(C) water.

In the present invention, there is also provided a vegetable and/or fruit drink composition, containing the following component (A), (D) and (C):

from 0.1 to 1.2 wt. % of (A) solids derived from vegetables and/or fruits,
(D) a neutral polysaccharide water-soluble dietary fiber, and
(C) water.

MODE FOR CARRYING OUT THE INVENTION

The present inventors prepared a drink containing vegetable juice or fruit juice and carried out various investigations on the grassy odor, heated odor caused by heat sterilization, and savory taste and ease of drinking. As a result, it has been found that by adding an acidic polysaccharide water-soluble dietary fiber and/or a neutral polysaccharide water-soluble dietary fiber and adjusting a solid content derived from vegetables or fruits within a predetermined range, a grassy odor and a heated odor caused by heat sterilization can be reduced and a savory taste can be enhanced, and a synergistic effect of them facilitates smooth drinking. The term "grassy odor" means an odor which we detect when inhaling an alcohol such as hexanol or hexanal, an aldehyde, a disulfide or a phthalide, while the term "savory taste" means a taste which we experience when taking an amino acid such as glutamic acid or inosinic acid in vegetables or fruits in the mouth.

The vegetable and/or fruit drink of the present invention can be taken for a prolonged period of time because it has a less grassy odor, a less heated odor caused by heat sterilization, a savory taste and improved ease of drinking. The vegetable and/or fruit drink composition of the present invention does not influence on the caloric intake. In addition, owing to a water-soluble dietary fiber contained in it, it is expected to have an intestinal function controlling effect or laxative effect.

The vegetable and/or fruit drink of the present invention contains squeeze of vegetables and/or fruits which is usually thought to have a grassy odor and disturb smooth drinking. Examples of the squeeze of vegetables which are usually thought to have a grassy odor and disturb smooth drinking include tomato, carrot, spinach, cabbage, Brussels sprout, broccoli, cauliflower, celery, lettuce, parsley, watercress, kale and soybean. Similarly, examples of the squeeze of fruits which is usually thought to have a grassy odor and disturb smooth drinking include melon, watermelon, Japanese plum, kiwifruit, guava and prune. Component (A) to be used in the present invention is a solid derived from vegetables and/or fruits and the amount of the solid is from 0.1 to 1.2 wt. % as a dry weight. Examples of such vegetables and fruits include vegetables such as tomato, carrot, spinach, cabbage, Brussels sprout, broccoli, cauliflower, celery, lettuce, parsley, watercress, kale and soybean and fruits such as lemon, grapefruit, orange, apple, grape, melon, watermelon, Japanese plum, kiwifruit, guava and prune. In the present invention, a predetermined amount of a solid derived from these vegetables and/or fruits is contained. The term "solid" as used herein means an insoluble substance having a size of 833 μm or less which disperses in an aqueous solution and the weight of the solid can be measured in the following manner. Described specifically, a sample which has been temperature-controlled to 25° C. is stirred well to homogenize it. The resulting sample is then filtered through a 20-mesh (opening of the mesh of the sieve: 833 μm) Tyler standard sieve. After homogenization of the sample which has passed through the mesh, a 10-g portion is weighed in a centrifuge tube, followed by centrifugal separation for 30 minutes by using a high-speed refrigerated centrifuge ("Himac CR20G", product of Hitachi Koki Co., Ltd.) at treating temperature of 20° C. and maximum centrifugal acceleration set within a range of from $4\times10^5$ to $5.2\times10^5$ [m/s$^2$]. The filter paper having a retention particle size of 1 μm ("No. 5C", product of ADVANTEC MFS, Inc. diameter: 90 mm) was weighed and then supernatant solids in the centrifuge tube after centrifugation were collected by filtration. The solids remaining in the centrifuge tube were all washed with water. All the solids were collected on the same filter paper and washed with water. After the filter paper was dried, its weight was measured. The weight of solids in 10 g of the sample was found from the following equation: (weight of solids)=(weight of filter paper after drying)−(weight of filter paper).

When the weight of solids contained in the drink containing squeeze of vegetables and/or fruits having a strong grassy odor is excessively small, the drink becomes unsuited for drinking owing to a strong grassy odor. When the weight of solids is excessively large, on the other hand, the viscosity and unpleasant heated odor caused by heat sterilization increase, which disturbs smooth drinking.

The content (dry weight) of Component (A) in the vegetable and/or fruit drink composition of the present invention is preferably from 0.1 to 1.2 wt. %, more preferably from 0.2 to 0.9 wt. %, still more preferably from 0.21 to 0.85 wt. %, still more preferably from 0.25 to 0.8 wt. %, especially preferably from 0.3 to 0.6 wt. % of the composition which has passed through a 20-mesh Tyler standard sieve. When solids are contained much in the squeeze of vegetables and/or fruits having a grassy odor, the weight of solids can be adjusted by removing the solids by filtration or centrifugal separation. When only a small or trace amount of solids is contained in the squeeze of vegetables and/or fruits having a grassy odor, the weight of solids can also be adjusted by adding a solid obtained from other vegetables and/or fruits by filtration or centrifugal separation.

The acidic polysaccharide water-soluble dietary fiber serving as Component (B) in the present invention is an acidic polysaccharide dietary fiber which is water soluble. The term "acidic polysaccharide water-soluble dietary fiber" means a dietary fiber containing many acidic groups such a carboxyl group, sulfonyl group and sulfuric acid residue. A white precipitate appears by the addition of 1 mL of a 0.02 mol/L aqueous solution of sodium sulfate and 1 mL of a 1 wt. % aqueous solution of cetyltrimethylammonium chloride to 1 mL of a 1 wt. % aqueous solution of an acidic polysaccharide water-soluble dietary fiber.

The acidic polysaccharide water-soluble dietary fiber to be used in the present invention is determined by the dietary fiber measuring method (the Prosky method) which is an AOAC official method. Described specifically, the weight (parts by weight) of it is determined by subtracting the weights of indigestible proteins and ash from the weight of a residue precipitated in an about 80 wt. % ethanol after a series of enzymatic treatments under specific conditions.

The acidic polysaccharide water-soluble dietary fiber to be used in the present invention is preferably available from plants, seaweeds or fungi by extraction, decomposition and purification. Specific examples include alginic acid, depolymerised alginic acid, carrageenan, fucoidan, porphylan, agalopectin, pectin, low-molecular pectin, gum arabic, karaya gum, gellan gum and xanthan gum and salts thereof. They may be added either singly or in combination of two or more. As the salts, alkali metal salts are preferred, with sodium salts being more preferred. The acidic polysaccharide water-soluble dietary fiber of the present invention can reduce the grassy odor and enhance the savory taste of a drink containing the squeeze of vegetables or fruits having a grassy odor.

Although no particular limitation is imposed on the viscosity of an aqueous solution of the acidic polysaccharide water-soluble dietary fiber (B), it preferably does not turn into a gel at a low concentration and does not have a high viscosity. In order to provide the drink composition in a form easy to drink, a 1 wt. % aqueous solution of the acidic polysaccharide water-soluble dietary fiber (B) preferably has fluidity at 25° C. The term "the fiber has fluidity" as used herein means that a 1 wt. % aqueous solution of the fiber prepared in a beaker flows out at 25° C. from the beaker when the beaker is turned upside down. The 1 wt. % aqueous solution has preferably a viscosity of 200 mPa·s or less, more preferably 50 mPa·s or less, still more preferably 20 mPa·s or less, still more preferably 10 mPa·s, yet still more preferably 5 mPa·s or less. The viscosity is measured using a Brookfield viscometer while applying a rotation speed of 60 rpm to a rotor (Rotor No. 2).

The content of Component (B) in the vegetable and/or fruit drink of the present invention is preferably from 0.5 to 30 wt. %, more preferably from 1 to 20 wt. %, still more preferably from 1 to 15 wt. %, still more preferably from 1.1 to 12 wt. %, still more preferably from 1.2 to 10 wt. %, still more preferably from 1.3 to 8 wt. %, yet still more preferably from 1.4 to 6 wt. %, from the viewpoints of a grassy odor reducing effect, and improving effects of a savory taste and ease of drinking.

Water serving as Component (C) needs to be added to the vegetable and/or fruit drink of the present invention to enhance smooth drinking. Its content is preferably 65 wt. % or greater, more preferably 80 wt. % or greater, especially preferably from 86 to 96 wt. % in the vegetable and/or fruit drink of the present invention.

The neutral polysaccharide water-soluble dietary fiber (D) to be used in the present invention is preferably available from plants, seaweeds or fungi by extraction, decomposition and purification. Specific examples include indigestible dextrin, guar gum, partially hydrolyzed guar gum, pullulan, water soluble corn fiber, hemicellulose, low-molecular hemicellulose, soybean dietary fiber, locust bean cum, konjac mannan, curdlan, and agar. They may be used either singly or in combination of two or more. The neutral polysaccharide water-soluble dietary fiber is determined by the dietary fiber measuring method (the Prosky method) which is an AOAC official method.

Although no particular limitation is imposed on the viscosity of an aqueous solution of the neutral polysaccharide water-soluble dietary fiber (B), it preferably does not turn into a gel at a low concentration and does not have a high viscosity. In order to provide the drink composition in a form easy to drink, a 1 wt. % aqueous solution of the neutral polysaccharide water-soluble dietary fiber (B) preferably has fluidity at 25° C. The 1 wt. % aqueous solution has preferably a viscosity of 200 mPa·s or less, more preferably 50 mPa·s or less, still more preferably 20 mPa·s or less, still more preferably 10 mPa·s, yet still more preferably 5 mPa·s. The viscosity is measured using a Brookfield viscometer while applying a rotation speed of 60 rpm to a rotor (Rotor No. 2).

The content of Component (D) in the vegetable and/or fruit drink of the present invention is preferably from 0.5 to 30 wt. %, more preferably from 1 to 20 wt. %, still more preferably from 1 to 15 wt. %, still more preferably from 1.1 to 12 wt. %, still more preferably from 1.2 to 10 wt. %, still more preferably from 1.3 to 8 wt. %, yet still more preferably from 1.4 to 6 wt, from the viewpoints of a grassy odor reducing effect, and improving effects of a savory taste and ease of drinking.

When Components (B) and (D) are used in combination, the total content of Components (B) and (D) in the vegetable and/or fruit drink of the present invention is preferably from 0.5 to 30 wt. %, more preferably from 1 to 20 wt. %, still more preferably from 1 to 15 wt. %, still more preferably from 1.1 to 12 wt. %, still more preferably from 1.2 to 10 wt. %, still more preferably from 1.3 to 8 wt. %, yet still preferably from 1.4 to 6 wt, from the viewpoints of a grassy odor reducing effect, and improving effects of a savory taste and ease of drinking.

In addition to these components, it is possible to add other dietary fibers, sugars (such as starch, dextrin and sucrose), proteins (casein, soybean protein and egg white), minerals (such as calcium carbonate and iron lactate), vitamins (vitamin A, $B_1$, $B_2$, $B_{12}$ and C), rice, barley, wheat, corn, meats, edible oil, seasonings as needed to the vegetable and/or fruit drink of the present invention. They may be used either singly or in combination. Of these, vitamins are especially preferred.

The vegetable and/or fruit drink of the present invention preferably has a pH of from 3 to 7, more preferably from 3.5 to 5.5, still more preferably from 3.8 to 4.6 from the viewpoints of storage stability and ease of drinking of the composition.

In addition, the vegetable and/or fruit drink of the present invention preferably contains solids passing through a 20-mesh Tyler standard sieve (opening of the mesh of the sieve: 833 μm), that is, solids having a size of 833 μm or less.

The vegetable and/or fruit drink of the present invention may contain additives such as antioxidants, flavors, various esters, organic acids, salts of an organic acid, inorganic acids, salts of an inorganic acid, inorganic salts, colorants, emulsifiers, preservatives, seasonings, pH regulators and quality stabilizers, depending on the components derived from vegetables or fruits. These additives may be used either singly or in combination.

Examples of the inorganic acids and salts thereof include phosphoric acid, disodium phosphate, sodium metaphosphate, and sodium polyphosphate.

As a container used for the vegetable and/or fruit drink of the present invention, ordinarily employed containers such as a molded container (so-called PET bottle) composed mainly of polyethylene terephthalate, a metal can, a paper container laminated with a metal foil or plastic film and a glass bottle can be used. The term "packaged drink" as used herein means a drink which can be taken without dilution.

The packaged vegetable and/or fruit drink composition of the present invention can be prepared by filling the composition in a container such as metal can and then sterilizing the container, if it can withstand heat sterilization, under conditions as specified by Food Sanitation Law. When the container cannot withstand retort sterilization, for example, a PET bottle or paper container, employed is a method of sterilizing the drink composition under similar sterilization conditions to those described above in advance, for example, by subjecting the drink composition to high-temperature short-time sterilization on a plate type heat exchanger, cooling it to a predetermined temperature and then, filling it in the container. Or, it is possible to fill, in a container filled with the composition, another component in a sterile condition.

EXAMPLES

Examples 1 to 5 and Comparative Examples 1 and 2

According to the formulation shown in Table 1, 125 g of drink compositions which were equal in the total weight but were different in a solid content in the system were prepared using depolymerised sodium alginate, partially hydrolyzed guar gumpartially hydrolyzed guar gum and tomato juice. The weight of solids was adjusted by removing solid matters by centrifugal separation or filtration from the tomato juice containing solid matters abundantly. The packaged drinks of Examples 1 to 22 and Comparative Examples 1 to 9 were all obtained by filling each composition in a package after filtration through a 20-mesh Tyler standard sieve, adjustment of pH to 4.3 with citric acid and trisodium citrate, and UHT sterilization under conditions of 124° C. and 30 seconds.

(Measuring Method of Weight of Solids)

A sample which has been temperature-controlled to 25° C. was stirred well to homogenize it. The resulting sample was filtered through a 20-mesh Tyler standard sieve. After homogenization of the sample which had passed through the mesh, 10 g of it was weighed in a centrifuge tube and centrifuged for 30 minutes by using a high-speed refrigerated centrifuge ("Himac CR20G", product of Hitachi Koki Co., Ltd.) at treating temperature of 20° C. and maximum centrifugal acceleration set within a range of from $4 \times 10^5$ to $5.2 \times 10^5$ [m/s$^2$]. The filter paper having a retention particle size of 1 μm ("No. 5C", product of ADVANTEC MFS, Inc. diameter: 90 mm) was weighed and then supernatant solids in the centrifuge tube after centrifugation were collected by filtration. The solids remaining in the centrifuge tube were all washed with water. All the solids were collected on the same filter paper and washed with water. After the filter paper was dried, the weight was measured. The weight of solids in 10 g of the sample was determined in accordance with the following equation: (weight of solids)=(weight of filter paper after drying)−(weight of filter paper).

TABLE 1

| | | Comparative Examples | | Examples | | | | |
|---|---|---|---|---|---|---|---|---|
| | | 1 | 2 | 1 | 2 | 3 | 4 | 5 |
| Depolymerised sodium alginate | Parts by weight | 0 | 2.4 | Same on the left | Same on the left | Same on the left | Same on the left | Same on the left |
| Partially hydrolyzed guar gum | Parts by weight | 0 | 1.6 | Same on the left | Same on the left | Same on the left | Same on the left | Same on the left |
| Tomato juice | Parts by weight | 100 | 96 | Same on the left | Same on the left | Same on the left | Same on the left | Same on the left |
| Total | Parts by weight | 100 | 100 | 100 | 100 | 100 | 100 | 100 |

TABLE 1-continued

|  |  |  | Comparative Examples | | Examples | | | | |
|---|---|---|---|---|---|---|---|---|---|
|  |  |  | 1 | 2 | 1 | 2 | 3 | 4 | 5 |
| Solid content |  | Wt. % | 1.3 | 1.3 | 1.1 | 0.9 | 0.5 | 0.4 | 0.2 |
| Results of organoleptic evaluation | Grassy odor |  | Base | Weak | A little weak | Weak | Weak | Weak | A little weak |
|  | Savory taste |  | Base | Fair | Fair | Sufficient | Sufficient | Sufficient | Sufficient |
|  | Heated odor |  | Base | Equal | A little weak | A little weak | Weak | Weak | Very weak |
|  | Light feel |  | Base | None | Fair | Sufficient | Sufficient | Sufficient | Sufficient |
|  | Overall evaluation |  | Base | Not good | Fair | Fair | Good | Good | Fair |

Two or three quasi-analytical panel was asked to evaluate seven kinds of drinks including the tomato juices obtained in Examples 1 to 5 and Comparative Examples 1 and 2 shown in Table 1. Evaluation was made in the following manner: These experts took the drinks (Examples 1 to 5 and Comparative Example 2) containing an acid polysaccharide dietary fiber (B) and neutral polysaccharide dietary fiber (D) and the drink (Comparative Example 1) containing neither the component (B) nor (D). The grassy odor, savory taste, heated odor and light feel of the drinks containing components (B) and (D) were compared with those of the drink of Comparative Example 1 (reference) containing neither Component (B) nor (D). The results are shown in Table 1.
Grassy odor: very weak, weak, a little weak, equal, a little strong, strong.
Savory taste: sufficient, fair, equal, poor, none. Heated odor: very weak, weak, a little weak, equal, a little strong, strong.
Light feel: sufficient, fair, equal, poor, none.
Overall evaluation: good, fair, equal, poor, bad.

As is apparent from Table 1, when a solid content is 1.3 wt. % and unduly large, ease of drinking cannot be enhanced because existence of the acidic polysaccharide dietary fiber and neutral polysaccharide dietary fiber induces generation of a heated odor and impairs a light feel, though it contribute to a reduction in grassy odor and enhancement of savory taste. It has been confirmed, on the other hand, that when the solid content is from 0.2 to 1.1 wt. %, incorporation of the acidic polysaccharide dietary fiber and neutral polysaccharide dietary fiber enhances the ease of drinking because it reduces a grassy odor, enhances a savor taste, reduces a heated odor, and provides a light feel.

Examples 6 to 8 and Comparative Examples 3 and 4

According to the formulation of Table 2, 125 g of drink compositions containing a vegetable juice of tomatoes, red bell peppers and spinaches and a fruit juice of apples and grapes, in which the total weight of these vegetable and fruit juices, depolymerised sodium alginate, and partially hydrolyzed guar gum is equal and the solid content is different, were prepared.

TABLE 2

|  |  | Comparative Examples | | Examples | | |
|---|---|---|---|---|---|---|
|  |  | 3 | 4 | 6 | 7 | 8 |
| Depolymerised sodium alginate | Parts by weight | 0 | 2.4 | Same on the left | Same on the left | Same on the left |
| Partially hydrolyzed guar gum | Parts by weight | 0 | 1.6 | Same on the left | Same on the left | Same on the left |
| Mixture of squeezes | Parts by weight | 100 | 96 | Same on the left | Same on the left | Same on the left |
| Total | Parts by weight | 100 | 100 | 100 | 100 | 100 |
| Solid content | Wt. % | 1.3 | 1.3 | 0.9 | 0.4 | 0.2 |
| Results of organoleptic evaluation | Grassy odor | Base | A little weak | Weak | Weak | Weak |
|  | Savory taste | Base | Fair | Fair | Fair | Fair |
|  | Light feel | Base | None | Sufficient | Sufficient | Sufficient |
|  | Overall evaluation | Base | Equal | Good | Good | Good |

In Table 2, the mixture of squeezes means a mixture of a vegetable juice (containing 50 wt. % of tomatoes, 10 wt. % of red bell peppers and 10 wt. % of spinaches) and a fruit juice (containing 15 wt. % of apple and 15 wt. % of grape), straight juice.

Two or three quasi-analytical panel was asked to evaluate five kinds of drinks obtained in Examples 6 to 8 and Comparative Examples 3 and 4 shown in Table 2.

As is apparent from Table 2, the drinks having a solid content of 0.2 wt. %, 0.4 wt. % and 0.9 wt. %, respectively each has a less grassy odor due to the vegetable juice of tomatoes, red bell peppers and spinaches, an enhanced savory taste and a light feel by the incorporation of the acidic polysaccharide water-soluble dietary fiber and neutral polysaccharide dietary fiber and adjustment of the weight of solids. The drinks having a solid content of 1.3 wt. %, on the other hand, have a little weakened grassy odor owing to the addition of the acidic polysaccharide water-soluble dietary fiber and neutral polysaccharide dietary fiber, but has a reduced light feel owing the addition so that ease of drinking as a whole is similar to that before the addition of dietary fibers.

Examples 9 and 10, and Comparative Examples 5 and

According to the formulation in Table 3, 125 g of drink compositions, in which the total weight of a depolymerised sodium alginate, a partially hydrolyzed guar gum and a vegetable-fruit mixed juice composed mainly of kale is equal and the content causing turbidity is different, were prepared.

TABLE 3

|  |  | Comparative Examples | | Examples | |
|---|---|---|---|---|---|
|  |  | 5 | 6 | 9 | 10 |
| Depolymerised sodium alginate | Parts by weight | 0 | 2.4 | Same on the left | Same on the left |
| Partially hydrolyzed guar gum | Parts by weight | 0 | 1.6 | Same on the left | Same on the left |
| Mixture of squeezes | Parts by weight | 100 | 96 | Same on the left | Same on the left |
| Total | Parts by weight | 100 | 100 | 100 | 100 |
| Solid content | Wt. % | 1.3 | 1.3 | 0.3 | 0.2 |
| Results of organoleptic evaluation | Grassy odor | Base | A little weak | Very weak | Weak |
|  | Savory taste | Base | Fair | Sufficient | Sufficient |
|  | Light feel | Base | None | Sufficient | Sufficient |
|  | Overall evaluation | Base | Equal | Good | Good |

As the mixture of squeezes in Table 3, a mixture of vegetable juice (containing 10 wt. % of Brussels sprout, 50 wt. % of kale and 10 wt. % of spinach) and fruit juice (containing 30 wt. % of apples), straight juice was used.

Two or three quasi-analytical panel was asked to evaluate four kinds of the drinks obtained in Examples 9 and 10 and Comparative Examples 5 and 6 shown in Table 3.

As is apparent from Table 3, each of the respective drink compositions having solid contents of 0.2 wt. % and 0.3 wt. % is much improved in ease of drinking because a grassy odor due to vegetable juice of Brussels sprouts, kale and spinaches is reduced, a savory taste is enhanced and light feel is given by the acidic polysaccharide water-soluble dietary fiber and neutral polysaccharide dietary fiber contained in the composition. The drink having a solid content of 1.3 wt. %, on the other hand, has a grassy odor reduced a little by the addition of the acidic polysaccharide water-soluble dietary fiber and neutral polysaccharide dietary fiber, but provides no light feel so that the ease of drinking as a whole is similar to that added with no dietary fibers.

Examples 11 to 15, and Comparative Examples 1 and 7

According to the formulation in Table 4, 100 g of tomato-containing drink compositions, in which the solid content in the system is equal and the weight of depolymerised sodium alginate is different, were prepared. The weight of solids was adjusted by removing solid matters through centrifugation or filtration from a tomato juice containing solid matters abundantly.

Two or three quasi-analytical panel was asked to evaluate seven kinds of tomato-juice-containing drinks obtained in Examples 11 to 15 and Comparative Examples 1 and 7 shown in Table 4.

As is apparent from Table 4, it has been confirmed that the drink compositions having a solid content of 0.5 wt. % are improved in ease of drinking as a whole because addition of from 0.5 wt. % to 6 wt. % of the acidic polysaccharide dietary fiber reduces a grassy odor and enhances a savory taste. When no acidic polysaccharide dietary fiber is added, on the other hand, the drink having a solid content of 0.5 wt. % has an enhanced grassy odor and therefore is deteriorated in ease of drinking as a whole.

Examples 12, 16 to 21, and Comparative Examples 1 and 7

According to the formulation in Table 5, 100 g of tomato-containing drink compositions, in which the solid content in the system is equal and the amount of dietary fiber is different, were prepared. The weight of solids was adjusted by removing the solid matters through centrifugation or filtration from a tomato juice containing solid matters abundantly.

TABLE 4

|  |  | Comparative Examples | | Examples | | | | |
|---|---|---|---|---|---|---|---|---|
|  |  | 1 | 7 | 11 | 12 | 13 | 14 | 15 |
| Depolymerised sodium alginate | Parts by weight | 0 | 0 | 0.5 | 1.0 | 2.0 | 3.0 | 6.0 |
| Tomato juice | Parts by weight | 100 | 100 | 99.5 | 99.0 | 98.0 | 97.0 | 94.0 |
| Total | Parts by weight | 100 | 100 | 100 | 100 | 100 | 100 | 100 |
| Solid content | Wt. % | 1.3 | 0.5 | 0.5 | 0.5 | 0.5 | 0.5 | 0.5 |
| Results of organoleptic evaluation | Grassy odor | Base | A little strong | A little weak | Weak | Weak | Weak | Weak |
|  | Savory taste | Base | Equal | Fair | Fair | Sufficient | Sufficient | Sufficient |
|  | Overall evaluation | Base | Poor | Good | Good | Good | Good | Fair |

TABLE 5

|  |  | Comparative Examples | | Examples | | | | | | |
| --- | --- | --- | --- | --- | --- | --- | --- | --- | --- | --- |
|  |  | 1 | 7 | 12 | 16 | 17 | 18 | 19 | 20 | 21 |
| Depolymerised sodium alginate | Parts by weight | 0 | 0 | 1.0 | | | | | | |
| Low-molecular hemicellulose | Parts by weight | | | | 1.0 | | | | | |
| Indigestible dextrin | Parts by weight | | | | | 1.0 | | | | |
| Gum arabic | Parts by weight | | | | | | 1.0 | | | |
| Partially hydrolyzed guar gum | Parts by weight | | | | | | | 1.0 | | |
| Low-molecular pectin | Parts by weight | | | | | | | | 1.0 | |
| Sodium alginate | Parts by weight | | | | | | | | | 1.0 |
| Tomato juice | Parts by weight | 100 | 100 | 99.0 | Same on the left | Same on the left | Same on the left | Same on the left | Same on the left | Same on the left |
| Total | Parts by weight | 100 | 100 | 100 | 100 | 100 | 100 | 100 | 100 | 100 |
| Solid content | Wt. % | 1.3 | 0.5 | 0.5 | Same on the left | Same on the left | Same on the left | Same on the left | Same on the left | Same on the left |
| Results of organoleptic evaluation | Grassy odor | Base | A little strong | Weak | Weak | Weak | A little weak | A little weak | Weak | Weak |
|  | Savory taste | Base | Equal | Fair | Fair | Fair | Fair | Fair | Sufficient | Fair |
|  | Overall evaluation | Base | Poor | Good | Good | Good | Good | Good | Good | Good |

Two or three quasi-analytical panel was asked to evaluate nine kinds of tomato-juice-containing drinks obtained in Examples 12, 16 to 21 and Comparative Examples 1 and 7 shown in Table 5.

As is apparent from Table 5, it has been confirmed that the drink compositions having a solid content of 0.5 wt. % are improved in ease of drinking as a whole because addition of 1 wt. % of the acidic polysaccharide dietary fiber or 1 wt. % of the neutral polysaccharide dietary fiber reduces a grassy odor and enhances a savory taste of the compositions.

Example 22 and Comparative Examples 8 and 9

According to the formulation in Table 6, 125 g of drink compositions containing vegetable juice of carrot, celery and broccoli, in which the total amount of the vegetable juice, depolymerised sodium alginate and partially hydrolyzed guar gum is equal and the solid content in the system is different, were prepared.

TABLE 6

|  |  | Comparative Examples | | Examples |
| --- | --- | --- | --- | --- |
|  |  | 8 | 9 | 22 |
| Depolymerised sodium alginate | Parts by weight | 0 | 2.4 | Same on the left |
| Partially hydrolyzed guar gum | Parts by weight | 0 | 1.6 | Same on the left |
| Mixture of squeezes | Parts by weight | 100 | 96 | Same on the left |
| Total | Parts by weight | 100 | 100 | 100 |
| Solid content | Wt. % | 1.3 | 1.3 | 0.5 |
| Results of organoleptic evaluation | Grassy odor | Base | A little weak | Weak |
|  | Savory taste | Base | Fair | Fair |
|  | Light feel | Base | None | Sufficient |
|  | Overall evaluation | Base | Equal | Good |

As the mixture of squeezes in Table 6, a vegetable juice mixture (containing 80 wt. % of carrot, 10 wt. % of celery and 10 wt. % of broccoli), straight juice, was used.

Two or three quasi-analytical panel was asked to evaluate three kinds of drinks obtained in Example 22 and Comparative Examples 8 and 9 shown in Table 6.

As is apparent from Table 6, the drink composition has a reduced grassy odor derived from the vegetable juice made of carrot, celery and broccoli, an enhanced savory taste and a light feel. The drink composition having a solid content of 1.3 wt. %, on the other hand, has a grassy odor a little weakened by the addition of the acidic polysaccharide water-soluble dietary fiber and neutral polysaccharide dietary fiber, but has a less light feel so that ease of drinking as a whole is similar to that added with no dietary fiber.

The invention claimed is:

1. A vegetable drink composition, comprising the following components (A), (B) and (C):
    (A) an insoluble substance derived from a vegetable, wherein the amount of the insoluble substance in the drink as a dry weight of the insoluble substance is from 0.1 to 0.6 wt. %, and wherein the insoluble substance contained in the vegetable drink has a particle size of 833 μm or less,
    (B) an acidic polysaccharide water-soluble dietary fiber, and
    (C) water,
    wherein the amount of the component (C) is from 65 to 96 wt. %.

2. The vegetable drink composition according to claim 1, further comprising (D) a neutral polysaccharide water-soluble dietary fiber.

3. A vegetable drink composition, comprising the following component (A), (D) and (C):
    (A) an insoluble substance derived from a vegetable, wherein the amount of the insoluble substance in the drink as a dry weight of the insoluble substance is from 0.1 to 0.6 wt. %, and wherein the insoluble substance contained in the vegetable drink has a particle size of 833 μm or less,
    (D) a neutral polysaccharide water-soluble dietary fiber, and
    (C) water,
    wherein the amount of the component (C) is from 65 to 96 wt. %.

4. The vegetable drink composition according to claim 1 or 2, wherein the content of Component (B) is from 0.5 to 30 wt. %.

5. The vegetable drink composition according to claim 3, wherein the content of Component (D) is from 0.5 to 30 wt. %.

6. The vegetable drink composition according to claim 2, wherein the total content of Components (B) and (D) is from 0.5 to 30 wt. %.

7. The vegetable drink composition according to claim 1, wherein the vegetable drink is at least one type of vegetable drinks selected from the group consisting of tomato, carrot, kale, broccoli, celery, red bell pepper, spinach and Brussel sprout.

8. The vegetable drink composition according to claim 1, which has been subjected to a heat sterilization.

9. The vegetable drink composition according to claim 1, which is a packaged drink.

10. The vegetable drink composition of claim 1, wherein the content of the acidic polysaccharide water-soluble dietary fiber (B) is from 1.1 to 30 wt. %.

11. The vegetable drink composition of claim 2, wherein the content at the neutral polysaccharide water-soluble dietary fiber (D) is from 1.1 to 30 wt. %.

12. The vegetable drink composition of claim 2, wherein the total content at Components (B) and (D) is from 1.1 to 30 wt. %.

13. The vegetable drink composition of claim 1, wherein the acidic polysaccharide water-soluble dietary fiber (B) is at least one fiber selected from the group consisting of alginic acid, depolymerized alginic acid, fucoidan, prophylan, agalopectin, low-molecular weight pectin, and karaya gum.

14. The vegetable drink composition of claim 1, wherein the acidic polysaccharide water-soluble dietary fiber (B) is at least one fiber selected from the group consisting of alginic acid, depolymerized alginic acid, and low-molecular weight pectin.

15. The drink composition of claim 1, wherein the drink composition further comprises squeeze of at least one fruit.

16. The drink composition of claim 3, wherein the drink composition further comprises squeeze of at least one fruit.

17. The vegetable drink composition according to claim 1, wherein the amount of the insoluble substance in the drink as a dry weight of the insoluble substance is from 0.3 to 0.6 wt. %.

18. The vegetable drink composition according to claim 3, wherein the amount of the insoluble substance in the drink as a dry weight of the insoluble substance is from 0.3 to 0.6 wt. %.

19. The vegetable drink composition according to claim 1, wherein the amount of Component (C) is from 80 to 96 wt. % in the drink.

20. The vegetable drink composition according to claim 1, wherein the amount of Component (C) is from 86 to 96 wt. % in the drink.

21. The vegetable drink composition according to claim 1, wherein the acidic polysaccharide water-soluble dietary fiber (B) is at least one fiber selected from the group consisting of fucoidan, prophylan, agalopectin, low-molecular weight pectin, and karaya gum.

22. A vegetable drink composition comprising the following components (A), (B) and (C):
(A) an insoluble substance derived from a vegetable wherein the amount of the insoluble substance in the vegetable drink as a dry weight of the insoluble substance is from 0.1 to 0.6 wt. %, and wherein the insoluble substance contained in the vegetable drink has a particle size of 833 μm or less,
(B) at least one acidic polysaccharide water-soluble dietary fiber selected from the group consisting of alginic acid, depolymerized alginic acid, carrageenan, fucoidan, poryphylan, karaya gum, gellan gum, and xanthan gum and salts thereof, and
(C) water,
wherein the amount of the component (C) is from 65 to 96 wt. %.

23. The vegetable drink composition according to claim 22, further comprising (D) at least one neutral polysaccharide water-soluble dietary fiber selected from the group consisting of indigestive dextrin, guar gum, partially hydrolyzed guar gum, pullulan, water soluble corn fiber, hemicelluloses, low-molecular hemicelluloses, soybean dietary fiber, locust bean gum, konjac mannan, curdlan and agar.

24. The vegetable drink composition according to claim 22, wherein the acidic polysaccharide water-soluble dietary fiber is at least one fiber selected from the group consisting of alginic acid and depolymerized alginic acid.

25. A vegetable drink composition comprising the following components (A), (D) and (C):
(A) an insoluble substance derived from a vegetable wherein the amount of the insoluble substance in the vegetable drink as a dry weight of the insoluble substance is from 0.1 to 0.6 wt. %, and wherein the insoluble substance contained in the vegetable drink has a particle size of 833 μm or less,
(D) at least one neutral polysaccharide water-soluble dietary fiber selected from the group consisting of indigestive dextrin, guar gum, partially hydrolyzed guar gum, pullulan, water soluble corn fiber, hemicelluloses, low-molecular hemicelluloses, soybean dietary fiber, locust bean gum, konjac mannan, curdlan and agar, and
(C) water,
wherein the amount of the component (C) is from 65 to 96 wt. %.

26. The vegetable drink composition according to claim 22, further comprising (D) at least one neutral polysaccharide water-soluble dietary fiber selected from the group consisting of indigestive dextrin, pullulan, water soluble corn fiber, hemicelluloses, low-molecular hemicelluloses, soybean dietary fiber, locust bean gum, konjac mannan, curdlan and agar.

27. A vegetable drink composition comprising the following components (A), (B), (C), and (D):
(A) an insoluble substance derived from a vegetable wherein the amount of the insoluble substance in the vegetable drink as a dry weight of the insoluble substance is from 0.1 to 0.6 wt. %, and wherein the insoluble substance contained in the vegetable drink has a particle size of 833 μm or less,
(B) at least one acidic polysaccharide water-soluble dietary fiber selected from the group consisting of alginic acid, depolymerized alginic acid, carrageenan, fucoidan, poryphylan, karaya gum, gellan gum, and xanthan gum and salts thereof,
(C) water, and
(D) at least one neutral polysaccharide water-soluble dietary fiber selected from the group consisting of indigestive dextrin, pullulan, water soluble corn fiber, hemicelluloses, low-molecular hemicelluloses, soybean dietary fiber, locust bean gum, konjac mannan, curdlan and agar.

28. A vegetable drink composition comprising the following components (A), (D) and (C):
(A) an insoluble substance derived from a vegetable wherein the amount of the insoluble substance in the vegetable drink as a dry weight of the insoluble substance is from 0.1 to 0.6 wt. %, and wherein the insoluble substance contained in the vegetable drink has a particle size of 833 μm or less, (D) at least one neutral polysaccharide water-soluble dietary fiber selected from the group consisting of indigestive dextrin, pullulan, water soluble corn fiber, hemicelluloses, low-molecular hemicelluloses, soybean dietary fiber, locust bean gum, konjac mannan, curdlan and agar, and (C) water.

29. A vegetable drink composition comprising the following components (A), (B) and (C):

(A) an insoluble substance derived from a vegetable wherein the amount of the insoluble substance in the vegetable drink as a dry weight of the insoluble substance is from 0.1 to 0.6 wt. %, and wherein the insoluble substance contained in the vegetable drink has a particle size of 833 μm or less, (B) at least one acidic polysaccharide water-soluble dietary fiber selected from the group consisting of carrageenan, fucoidan, poryphylan, karaya gum, gellan gum, and xanthan gum and salts thereof, and (C) water.

* * * * *